United States Patent
Rossi et al.

(10) Patent No.: US 8,510,549 B2
(45) Date of Patent: Aug. 13, 2013

(54) TRANSMISSION OF PACKET DATA OVER A NETWORK WITH SECURITY PROTOCOL

(75) Inventors: Markku Tapio Rossi, Järvenpää (FI); Timo Johannes Rinne, Helsinki (FI)

(73) Assignee: Tectia Oyj, Helsinki (FI)

( * ) Notice: Subject to any disclaimer, the term of this patent is extended or adjusted under 35 U.S.C. 154(b) by 624 days.

(21) Appl. No.: 12/684,615

(22) Filed: Jan. 8, 2010

(65) Prior Publication Data

US 2010/0138649 A1 Jun. 3, 2010

Related U.S. Application Data

(63) Continuation of application No. 11/488,177, filed on Jul. 18, 2006.

(30) Foreign Application Priority Data

Jul. 19, 2005 (FI) ...................................... 20050769

(51) Int. Cl.
*G06F 21/00* (2013.01)
(52) U.S. Cl.
USPC .................. 713/151; 726/1; 726/3; 713/169; 455/419; 380/201; 380/270; 709/223
(58) Field of Classification Search
USPC ................................................. 713/151, 168
See application file for complete search history.

(56) References Cited

U.S. PATENT DOCUMENTS

| | | | |
|---|---|---|---|
| 4,802,220 A | 1/1989 | Marker | |
| 6,584,567 B1 | 6/2003 | Bellwood et al. | |
| 7,149,819 B2 * | 12/2006 | Pettey | 709/250 |
| 7,165,173 B1 * | 1/2007 | Herle | 713/151 |
| 7,493,383 B1 * | 2/2009 | Mukerji | 709/223 |
| 7,661,131 B1 * | 2/2010 | Shaw et al. | 726/15 |
| 2002/0049825 A1 * | 4/2002 | Jewett et al. | 709/215 |
| 2002/0097707 A1 * | 7/2002 | Balazinski et al. | 370/351 |

(Continued)

FOREIGN PATENT DOCUMENTS

WO  WO 2004092887  10/2004

OTHER PUBLICATIONS

Satran et al., "Internet Small Computer Systems Interface (iSCSI)," MemoRequest for Comments: 3720, The Internet Society, p. 1-63, (Apr. 2004).

(Continued)

*Primary Examiner* — Morshed Mehedi
(74) *Attorney, Agent, or Firm* — Pillsbury Winthrop Shaw Pittman, LLP

(57) ABSTRACT

A method, device, system and computer program for providing a transport distribution scheme for a security protocol are disclosed. A first packet data connection is established to a remote node for transmitting packet data over a network with a security protocol. An authentication procedure is performed with the remote node via the first packet data connection for establishing a security protocol session with the remote node. At least one security parameter is negotiated with the remote node for transmitting packets through the first packet data connection. A second packet data connection is established to the remote node, and at least one security parameter is negotiated with the remote node for use with the second packet data connection. The first and second packet data connections are handled as packet data subconnections associated with the security protocol session.

16 Claims, 7 Drawing Sheets

(56) References Cited

U.S. PATENT DOCUMENTS

| | | | |
|---|---|---|---|
| 2002/0152403 A1* | 10/2002 | Hand et al. | 713/201 |
| 2003/0005178 A1* | 1/2003 | Hemsath | 709/328 |
| 2003/0014624 A1* | 1/2003 | Maturana et al. | 713/151 |
| 2003/0028606 A1* | 2/2003 | Koopmans et al. | 709/206 |
| 2003/0108063 A1 | 6/2003 | Joseph et al. | |
| 2003/0154399 A1 | 8/2003 | Zuk et al. | |
| 2003/0177395 A1* | 9/2003 | Pardee et al. | 713/201 |
| 2003/0191935 A1 | 10/2003 | Ferguson | |
| 2003/0226017 A1 | 12/2003 | Palekar et al. | |
| 2003/0233583 A1* | 12/2003 | Carley | 713/201 |
| 2004/0015591 A1 | 1/2004 | Wang | |
| 2004/0223615 A1 | 11/2004 | Dhawan | |
| 2004/0264465 A1* | 12/2004 | Dunk | 370/392 |
| 2005/0025150 A1 | 2/2005 | Helmy et al. | |
| 2006/0005240 A1* | 1/2006 | Sundarrajan et al. | 726/15 |
| 2006/0123120 A1* | 6/2006 | Merkh et al. | 709/227 |
| 2006/0282545 A1 | 12/2006 | Arwe et al. | |
| 2008/0056501 A1* | 3/2008 | McGough | 380/281 |

OTHER PUBLICATIONS

Dierks et al., "The TLS Protocol Version 1.0," Memo Request for Comments:2246, Network Working Group, p. 1-33, (Jan. 1999).

Eric Rescorla, "SSL and TLS: Designing and Building Secure Systems," Addison-Wesley, 2001, pp. 18-19, 57-60, 62-67, 96-97, 300.

Masami Ishikura et al., "Multi connection TCP mechanism for high performance transport in an ATM Network," Broadband Communications: Global Infrastructure for the Information Age, Proceedings of the International IFIP-IEEE Conference on Broadband Communications, Apr. 23, 1996, pp. 443-454.

H. Sivakumar et al., "PSockets: The Case for Application-level Network Striping for Data Intensive Applications using High Speed Wide Area Networks," Supercomputing, Proceedings of the ACM/IEEE Conference, Nov. 2000; 6 pp.

* cited by examiner

TRANSMISSION OF PACKET DATA OVER A NETWORK WITH SECURITY PROTOCOL

CROSS-REFERENCE TO RELATED APPLICATIONS

This application is a continuation of co-pending U.S. Application Ser. No. 11/488,177, filed Jul. 18, 2006, and for which priority is claimed under 35 U.S.C. §120. This application is based upon and claims the benefit of priority under 35 U.S.C. §119 from the prior Finnish Patent Application No. FI 20050769, filed Jul. 19, 2005, the entire contents of both applications are incorporated herein by reference in their entireties.

BACKGROUND OF THE INVENTION

1. Field of the Invention

The present invention relates to transmission of packet data over a network. In particular the present invention relates to transmission of packet data over a network with a security protocol.

2. Description of the Related Art

Data transmission over packet data networks, in particularly over Internet Protocol (IP) based networks, is very common nowadays. There are, however, risks in using the Internet or other public data networks for communications. IP-based networks face threats such as viruses, malicious crackers and eavesdroppers.

Virus-scanning software and firewalls are widely used to prevent unauthorized access to internal networks from public networks. When confidential data is transmitted over a public packet data network, the data should be encrypted and the sender and receiver of the data should be authenticated. The security concerns relating to data transmission over public networks can be addressed in a variety of ways. One example is the use of the Internet Security protocol (IPSec) on the IP level. Another example is the use of a security protocol above the IP level.

The Secure Shell protocol is a security protocol that is typically used over the Transfer Control Protocol (TCP) and the Internet Protocol. In principle, the Secure Shell can be used above any protocol providing reliable data streams. A protocol proving reliable data streams refers here to a protocol ensuring that in normal situations a receiver receives data packets in the sending order and all sent data packets are received. The Secure Shell protocol provides encryption and integrity of data and authentication of the sender and receiver of data.

The Secure Shell protocol is in the following used as an example of a security protocol. The Secure Shell is being standardized in the SecSh Working Group of the Internet Engineering Task Force. The Secure Shell protocol is a packet protocol, and the protocol packets contain information about the length of the protocol packet and about padding length. The Secure Shell protocol packet then contains the actual payload and the padding data.

A Secure Shell protocol session between two endpoints is typically established in the following manner. First, a TCP connection is established between the endpoints for an initial key exchange. Thereafter the endpoints authenticate each other and agree on various security parameters by transmitting protocol messages over the TCP connection. After a successful authentication and security parameter negotiation, the negotiated security parameters define encryption and data integrity algorithms that are used for Secure Shell protocol packets transmitted over the TCP connection. Some further transmission parameters, for example data compression algorithms, may be defined for the data to be transmitted over the TCP connection.

There may be a plurality of channels within a single Secure Shell session. These channels share the authentication and negotiated security parameters, and data relating to all channels is transmitted over the TCP connection established for the Secure Shell session. New channels may be opened and existing channels may be closed during a Secure Shell session.

When the TCP connection carrying the Secure Shell protocol packets is slow or the TCP connection goes via overloaded networks, the throughput of the Secure Shell protocol is quite low. For some reason, the throughput is lower than what could be expected simply based on the throughput of the underlying TCP connection. Furthermore, if some TOP packets carrying Secure Shell protocol packets are lost and need to be retransmitted, it takes a while before the Secure Shell protocol recovers. This is at least partly due to the fact that the flow control of the Secure Shell is disturbed and the data buffers of the Secure Shell session may be filled. A further problem is that in an overloaded network, a TCP connection used by the Secure Shell protocol may be slower than TCP connection on the average.

Furthermore, data that is transmitted between the endpoints of a Secure Shell session may contains packet data relating to various applications, which have different security requirements. For example, packet data for a video player could suffice with a light encryption, whereas text files to be transmitted should be secured with a stronger encryption. It may be quite difficult to find encryption parameters to provide a suitable compromise. One option to overcome this problem is to open a plurality of Secure Shell protocol connections between the endpoints and to select the security parameters for the separate Secure Shell protocol connections to meet the requirements of the different applications, but this requires further memory and other resources in the endpoints.

There are thus various problems relating to providing a Secure Shell session over a TCP connection or other reliable packet data protocol connection. It is appreciated that although above reference is made mainly to the Secure Shell protocol, the problems may be relevant also for other security protocols.

Embodiments of the present invention aim to provide method for transmitting data over a network with a security protocol in a flexible manner.

SUMMARY OF THE INVENTION

In accordance with an embodiment, there is provided a method for transmitting packet data over a network with a security protocol. In the method a first packet data connection is first established to a remote node, whereafter an authentication procedure is performed with the remote node via the first packet data connection for establishing a security protocol session with the remote node. At least one security parameter is then negotiated with the remote node for transmitting packets through the first packet data connection. A second packet data connection is also established to the remote node, and at least one security parameter is negotiated with the remote node for use with the second packet data connection. The first and second packet data connections are handled as packet data subconnections associated with the security protocol session.

In accordance with another embodiment, there is provided a communication system that is configured to establish a first packet data connection to a remote node and to perform an authentication procedure with the remote node via the first packet data connection for establishing a security protocol session, and wherein at least one security parameter is negotiated with the remote node for transmitting packets through the first packet data connection. The system is further configured for establishing a second packet data connection to the remote node and for negotiating at least one security parameter with the remote node for use with the second packet data connection. In the system the first and second packet data connections are handled as packet data subconnections of the security protocol session.

In accordance with a further embodiment, there is provided a device for use in a communication system. The device is configured for establishing a first packet data connection to a remote node, for performing an authentication procedure with the remote node via the first packet data connection for establishing a security protocol session, and for negotiating at least one security parameter with the remote node for transmitting packets through the first packet data connection. The device is further configured for establishing a second packet data connection to the remote node and for negotiating at least one security parameter with the remote node for use with the second packet data connection. The devices handles the first and second packet data connections as packet data subconnections of the security protocol session.

Furthermore, there is provided a computer program with program code means to carry out the steps of a method in accordance with an aspect of the invention. The computer program can be executed in a computer or in a set of computers.

BRIEF DESCRIPTION OF THE DRAWINGS

Embodiments of the present invention will now be described by way of example only with reference to the accompanying drawings, in which.

DETAILED DESCRIPTION OF EMBODIMENTS
OF THE INVENTION

In the following, embodiments of the invention are often discussed in detail with reference to the Secure Shell protocol, but it is appreciated that embodiments of the invention may be applicable in connection with any security protocol using a reliable data transport protocol.

Figure 1A:
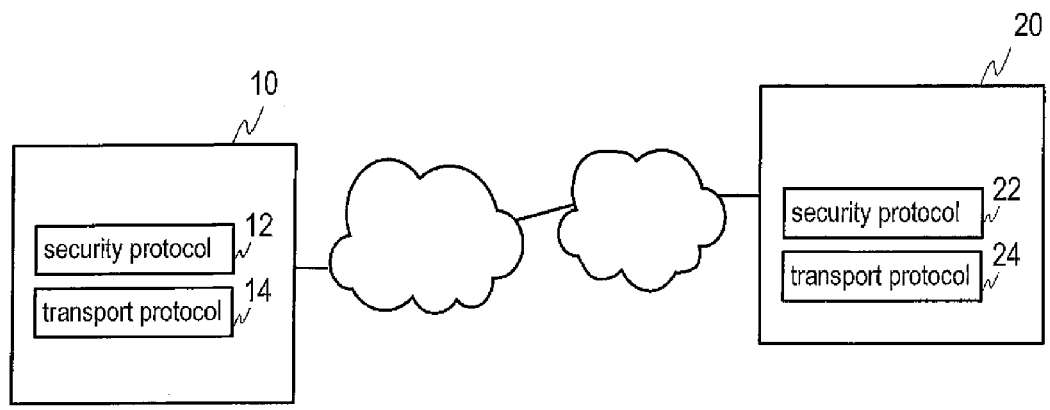
FIG. 1a shows schematically, as an example, a communication network and two nodes, where embodiments of the present invention are applicable.

FIG. 1a shows schematically a communication network and two nodes 10, 20 communicating via the communication network, for example via the Internet. The communication network may include various subnetworks, as shown in FIG. 1a. A security protocol is used to provide secure data transport between the nodes 10 and 20 over the communication network. One of the nodes is typically a server and the other node is a client. The client contacts the server for forming a secure connection between the nodes.

Figure 1B:
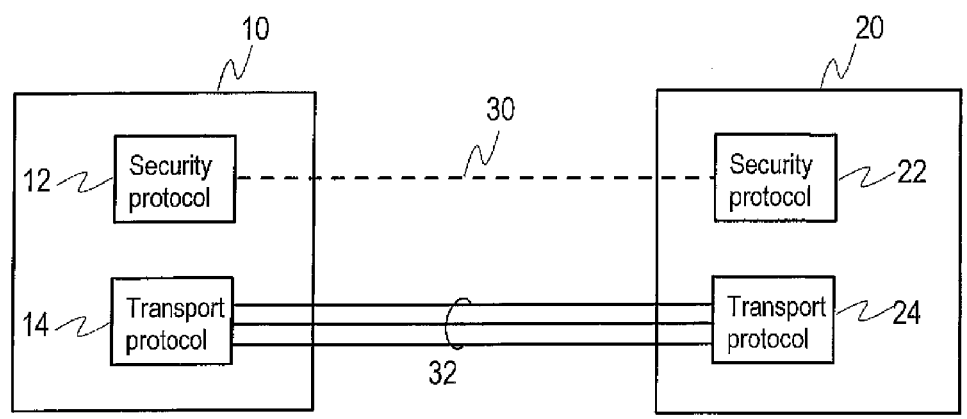
FIG. 1b shows schematically, as an example, a security protocol connection between two nodes in accordance with an embodiment of the present invention.

FIG. 1b shows schematically, as an example, a security protocol session (or a security protocol connection) 30 between two nodes 10, 20 in accordance with an embodiment of the present invention. Each of the two nodes 10, 20 has a security protocol entity 12, 22 providing the functionality of the security protocol. The security protocol entity is a computer program or part of a computer program. The security protocol session 30 is a logical connection between security protocol entities.

The data transfer for the security protocol entities 12, 22 is provided by transport protocol entities 14, 24. FIG. 1b shows a plurality of packet data connections 32 between the transport protocol entities 14, 24. This plurality of packet data connections forms a set of packet data subconnections of the security protocol session. In a specific embodiment of the invention, the security protocol is the Secure Shell protocol and the transport protocol is the Transfer Control Protocol (TCP). As discussed above, in principle the invention is applicable to any security protocol used on top of any reliable data transport protocol. If the security protocol does not rely on support of a reliable transport protocol, any transport protocol may be applicable.

In the following description, the term "packet data subconnection" refers to a packet data connection belonging to a set of packet data connections associated with a security protocol session. From the view of the security protocol session, there is thus either one packet data connection or a plurality of packet data subconnections associated with the security protocol session. It is appreciated that from the point of view of the transport protocol, a packet data subconnection of the security protocol session is typically similar to any packet data connection of the transport protocol.

It is evident to a skilled person that the packet data connections 32 of the transport protocol are implemented using further protocol entities, such as Internet Protocol entities. The details of the lower protocols and the physical medium between the nodes 10, 20 are irrelevant for the present invention, and they are therefore not discussed in detail in this connection.

Figure 2A:
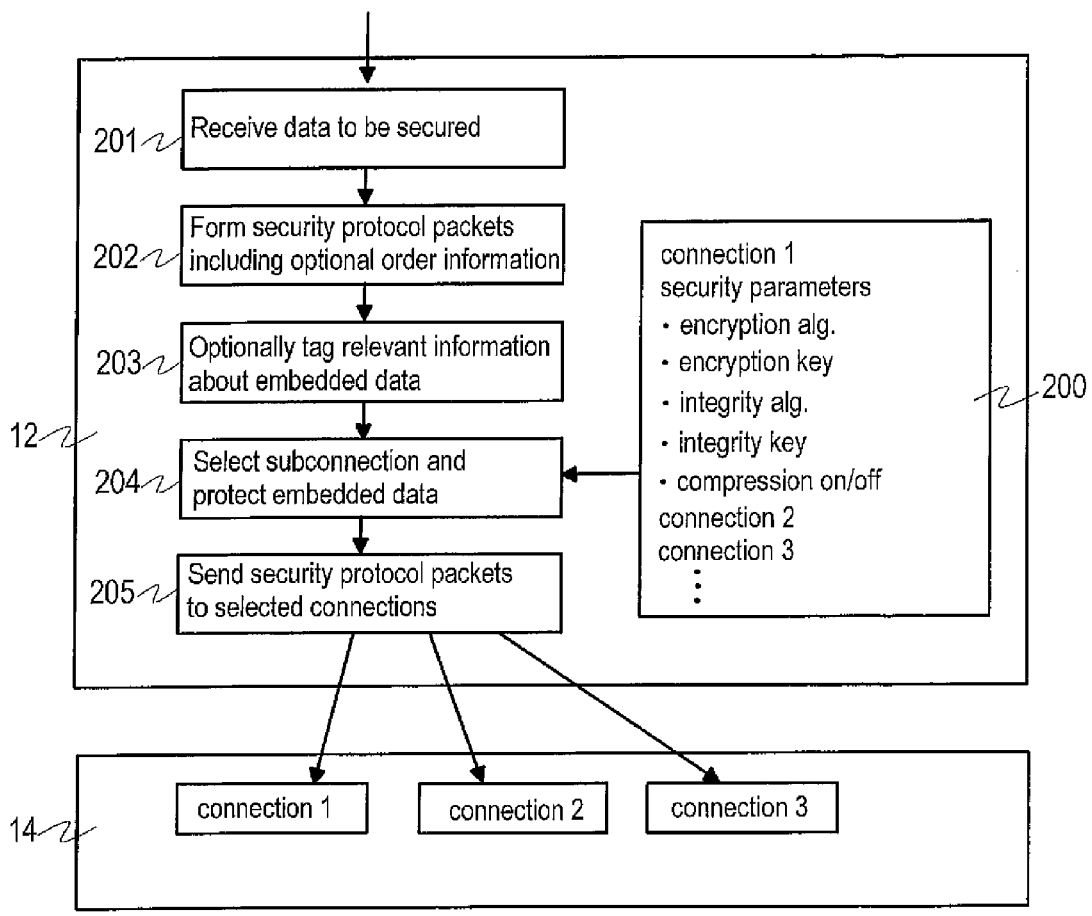
FIG. 2a shows, as an example, a block diagram of a security protocol entity in accordance with an embodiment of the present invention.

FIG. 2a shows, as an example, a block diagram of a security protocol entity 12 in accordance with an embodiment of the present invention. More specifically, FIG. 2a shows features relating to sending of information. The security protocol entity 12 typically maintains information about the packet data subconnections 32 relating to the security protocol session. In FIG. 2a, the information is shows as a table 200. The table 200 lists the available packet data subconnections. For each packet data subconnection, security parameters are typically listed. FIG. 2a shows, as an example, the following security parameters for connection 1: encryption algorithm, encryption key, integrity check algorithm, and integrity check key. Additionally, information about compression mode is stored for the connections. Also other connection-specific information could be listed in table 200. Typically at least parameter relating to encryption and integrity check algorithms and relating keys are among the security parameters. Any suitable encryption and data integrity algorithms may be used in connection with the present invention.

The security parameters of the packet data subconnections are typically decided when the packet data connections are established, and information is stored in the table 200 accordingly. It is possible that more than one packet data subconnection has identical security parameters. This way data can be distributed over a plurality of transport connections in the data transport level, but on the security protocol level the encryption/integrity checks/compression is the same. Distribution of security protocol packets over packet data subconnections having identical security parameters provides the advantage of distribution data over parallel connections. For example, if one of the packet data connections is slower than others temporarily, the other packet data connections may be used. Alternatively, each packet data subconnection may be used in turn (Round-Robin) for transferring security protocol packets. Alternatively, each packet data subconnection may have specific security parameters and a packet data connection is chosen based on the security needs of the data to be transmitted. A further alternative is to have groups of packet data connections, connection within each group having identical security parameters and the security parameters varying from group to group. Encryption and/or integrity check keys are typically different for the packet data subconnections.

It may be possible to change the security parameters of the packet data subconnections during the security protocol session and to update information stored in the table 200 accordingly. Alternatively or additionally, it may possible to close a packet data subconnection having security parameters no longer needed and to open a new packet data subconnection with new security parameters.

In block 201, a piece of data to be secured is received in the security protocol entity 12. This piece of data can be obtained, for example, from a specific application forwarding the data specifically to the security protocol entity 12. As a further example, there may be defined that certain data to a given destination needs to be secured. The security protocol entity 12 may in this case be configured to monitor data to be sent and capture data that needs to be secured.

Block 202 is responsible for forming a security protocol packet (or a plurality of security protocol packets) containing the received piece of data. The received piece of data is thus embedded in the security protocol packet(s). The formed security protocol packets usually contain some order information, typically sequence numbers, for enabling the receiving security protocol entity to process the security protocol packets received over a plurality of transport connections in a correct order. As a further example, time stamp information may be used as order information. The order information may be omitted, if the reception order of security protocol packets is irrelevant and/or the security protocol does not employ the concept of a security protocol packet flow.

In block 203, information about the embedded data, which is relevant for selection of a subconnection, may be tagged. This tagging may be done by placing flags to the data structure corresponding to the security protocol packet or by storing information about the embedded data to a separate data structure. As this information about the embedded data is relevant for the selection of the subconnection, it is typically not sent to the receiver of the security protocol packet. This information about the embedded data is typically used only by the sender of the protocol packet.

In block 204, a packet data subconnection is selected for the security protocol packet (optionally based on the data embedded in the security protocol packet). The data embedded in the security protocol packet is protected also in block 204. Information of the security parameters of the selected packet data subconnection is used in protecting the embedded data, in other words in encryption and in forming a cryptographic check sum). Also data compression possibly defined for the selected packet data subconnection is performed in block 204.

In block 205, the security protocol packet is sent to the selected packet data connection. It is clear to a skilled person that the transport protocol entity 14 may manage the plurality of packet data connections of the transport protocol in a standard manner.

Figure 2B:
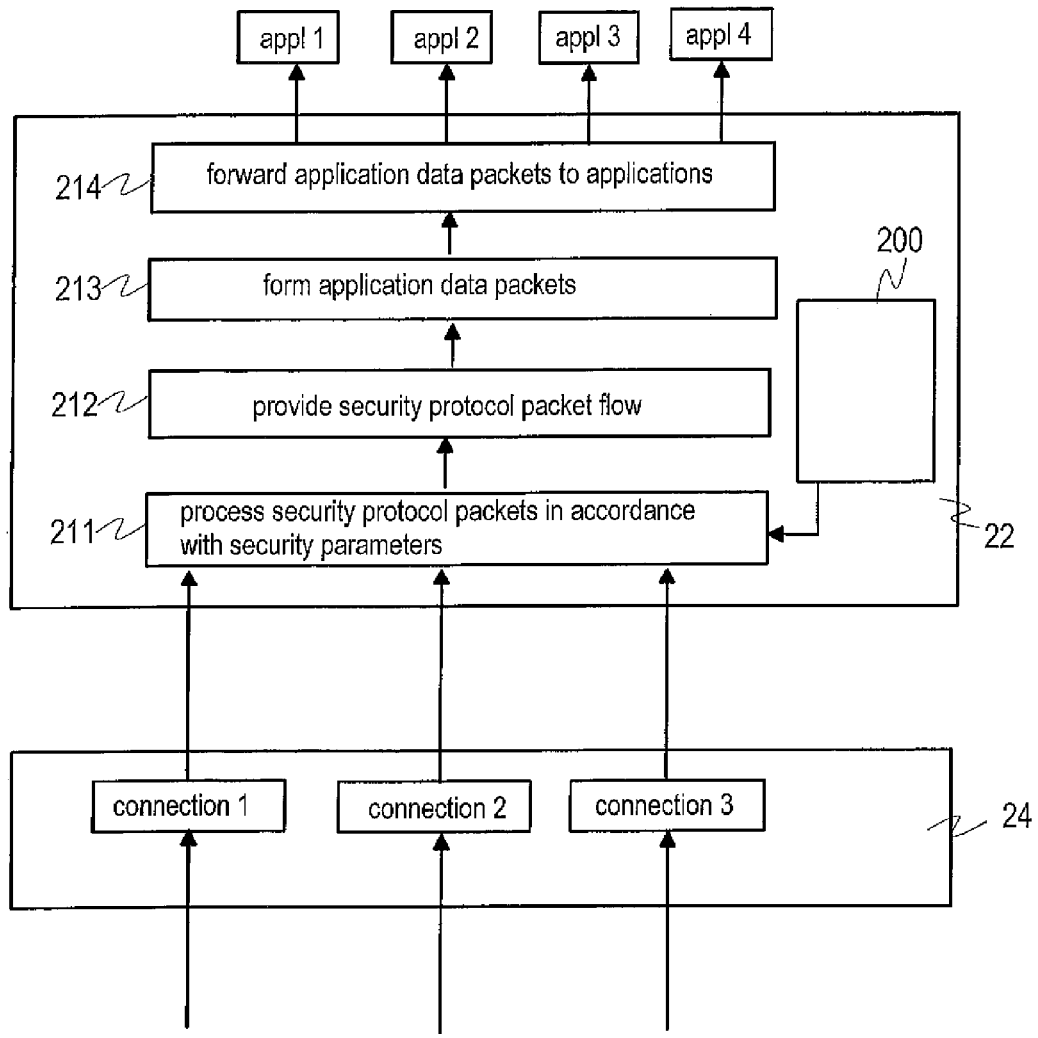
FIG. 2b shows, as an example, a further block diagram of a security protocol entity in accordance with an embodiment of the present invention.

FIG. 2b shows, as an example, a further block diagram of a security protocol entity in accordance with an embodiment of the present invention. In particular, FIG. 2b shows features relating to receipt of security protocol packets from a transport protocol entity 24 in a node 20. The transport protocol entity 24 forwards the security protocol packets it receives in a known manner to the security protocol entity 22. The security protocol entity 22 processes in block 211 a security protocol packet in accordance with the security parameters of the packet data subconnection via which the security packet was received. In other words, the encryption/data integrity/compression and other processing is done in accordance with security parameters stored in table 200. In block 212, the security protocol packet flow is restored using the order information carried in the security protocol packets (if any). In block 213, data to be forwarded to applications is extracted from the security protocol data packets. Typically this means forming of application data packets or upper layer protocol packets. In block 214, data is forwarded to applications or other recipients.

It is appreciated that typically a security protocol entity contains features relating to sending and receiving data, although in FIGS. 2a and 2b these features are shown separately for clarity reasons. It is also appreciated that the order of functions may be different than shown in FIGS. 2a and 2b.

Figure 3A:
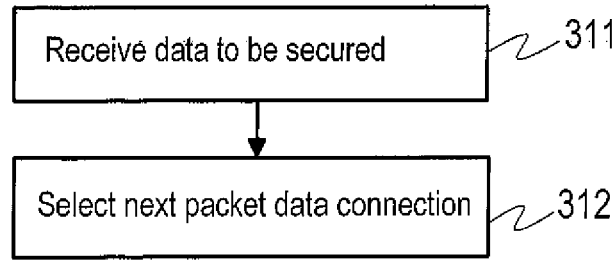
FIG. 3a shows, as a first example, a partial flowchart relating to selection of packet data subconnections.

FIG. 3a shows, as a first example, a partial flowchart relating to selection of packet data subconnections. Data to be sent in a secure manner is received in step 311. The packet data subconnection is selected in step 312 using Round-Robin algorithm. In other words, each subconnection is used in turn and for a specific security protocol packet a next packet data subconnection is selected.

Figure 3B:
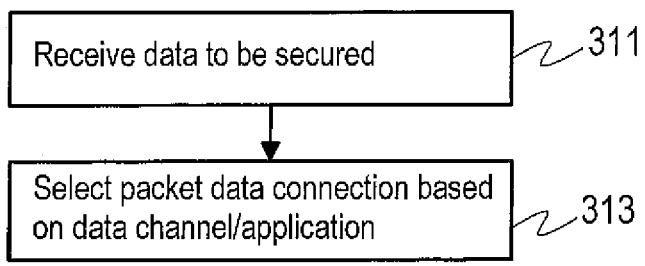
FIG. 3b shows, as a second example, a partial flowchart relating to an alternative selection of packet data subconnections.

FIG. 3b shows, as a second example, a partial flowchart relating to an alternative selection of packet data subconnections. In this example, the packet data subconnection is selected in step 313 based on the application from where the data originates. If the security protocol is used for tunneling packet data connections, the security protocol may determine the application, for example, based on the port number of the packet data connection to be tunneled. If the security protocol supports a number of channels within the security protocol connection, the packet data subconnections may be selected based on channels. For example, there may be a packet data subconnection (or a group of packet data subconnections with identical security parameters) for each channel.

Figure 3C:
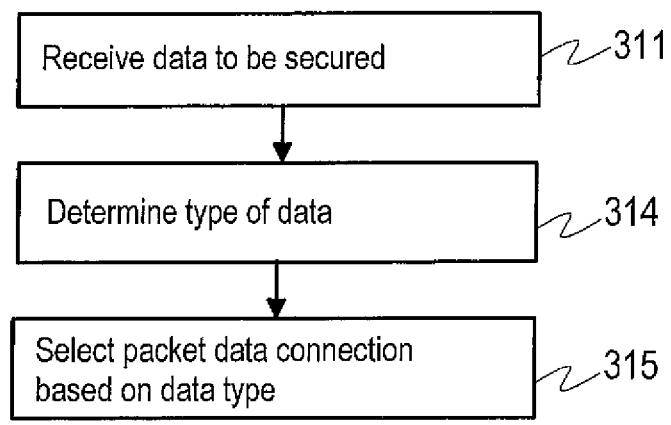
FIG. 3c shows, as a third example, a partial flowchart relating to a further alternative selection of packet data subconnections.

FIG. 3c shows, as a third example, a partial flowchart relating to a further alternative selection of packet data subconnections. In this example, the type of data to be transmitted securely in determined in step 314: A packet data subconnection is then selected in step 315 based on the data type.

Some examples of data characteristics based on which packet data subconnections can be selected are discussed below in connection with embodiments of the invention relating to the Secure Shell protocol. The examples are applicable also in connection with other security protocols. It is possible that in step 315 a packet data subconnection is selected from a group of packet data subconnections based, for example, on the Round-Robin algorithms or on the characteristics of the packet data subconnections.

It is clear to a skilled person that the features shown in FIGS. 3a to 3c can be combined in a variety of ways. Some examples have been mentioned above.

Figure 4:
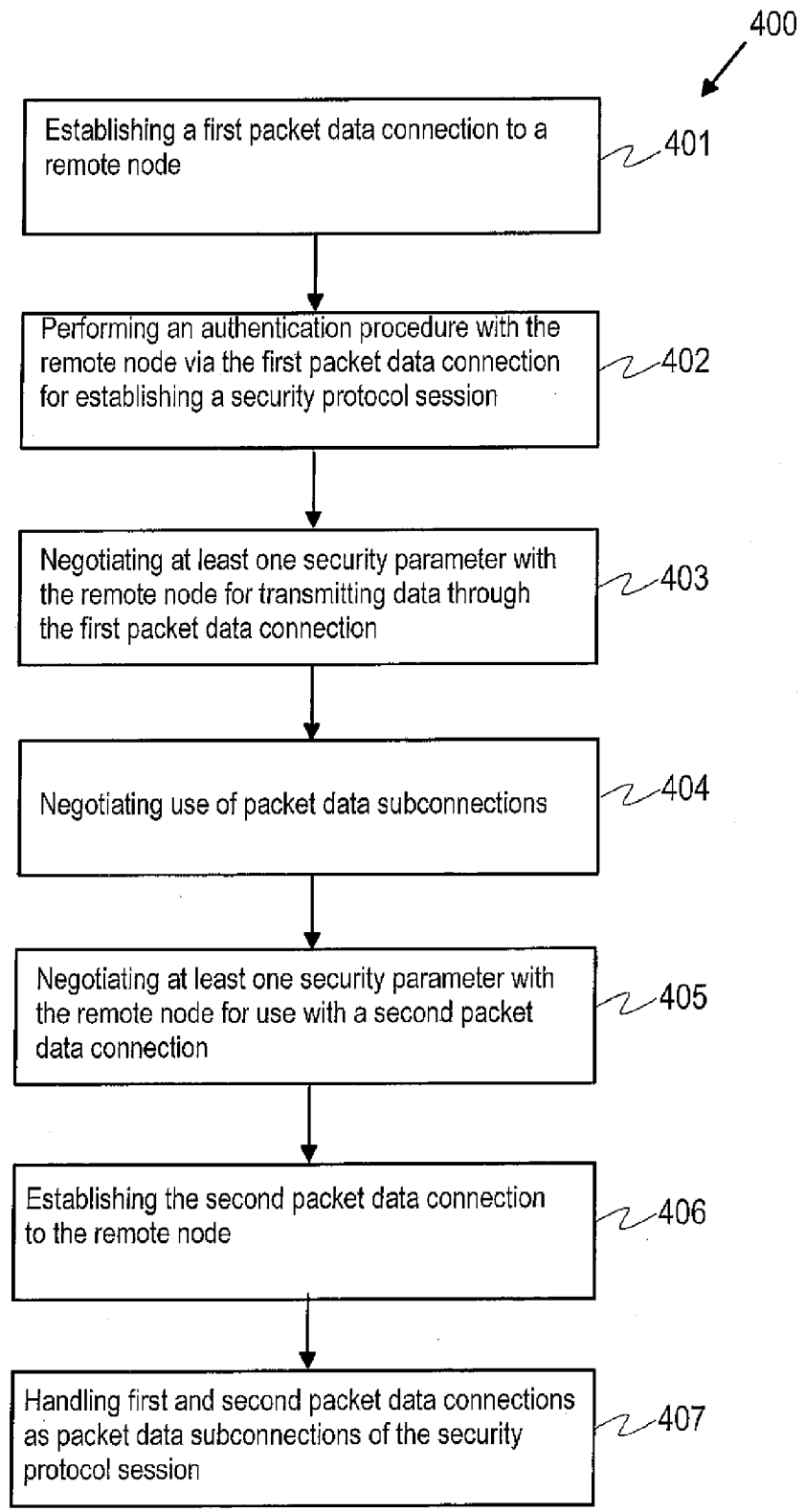
FIG. 4 shows, as an example, a flowchart of a method for setting up a security protocol connection in accordance with an embodiment of the invention.

FIG. 4 shows, as an example, a flowchart of a method 400 for setting up a security protocol session in accordance with an embodiment of the invention. In step 401, a first packet data connection is established with a remote node. The packet data connection may be a connection of any reliable transport protocol, for example, a TCP connection. In step 402, an authentication procedure is performed with the remote node via the first packet data connection for establishing a security protocol session. This authentication procedure typically provides mutual authentication between the nodes. Various authentication schemes may be employed, either alone or in combination. For example, a challenge-response scheme and/or a token-based authentication may be used.

In step 403, at least one security parameter is negotiated with the remote node for transmitting data through the first packet data connection. Typically at least some shared secret (session key) is formed in this negotiation for encrypting data and/or providing tamperproof integrity checksums. It is possible to negotiate the algorithms used for encryption and/or integrity checks. In addition to cryptographic parameters, it is possible to negotiate further parameters. For example, it is possible to negotiate whether data to be transmitted is compressed and using which algorithm. A whole cryptographic context (algorithms and keys) for the first packet data connection may be negotiated in step 403.

In step 404, the nodes negotiate use of at least two packet data subconnections for the security protocol session. In other words, in step 404 the use of packet data subconnections is negotiated. Step 404 may be optional, especially if the nodes already beforehand know that the other node supports use of packet data subconnections for the security protocol connection. The negotiation may be carried out using messages of the security protocol, or it may be carried out in out-of-band fashion. In its simplest form the negotiation may be one node indicating support for use of packet data subconnections for the security protocol session and the other node proceeding to step 405 in response to this indication. In step 405, the node negotiates at least one security parameter with the remote node for a second packet data connection. In step 406, the second packet data connection is established with the remote node.

In step 407, the first and second packet data connections are handled as packet data subconnections of the security protocol session. This means that data to be transmitted in the security protocol session is transmitted using a plurality of packet data subconnections instead of a single packet data connection. Various proposals for selecting packet data subconnections for security protocol packets are discussed above.

In addition to the two packet data subconnections, further packet data subconnections may be established between the node and the remote node for transmitting security protocol packets of the security protocol session.

It is appreciated that the order of the steps in FIG. 4 is an example, and the steps may be performed in a slightly differ-
ent order or interleaved with each other. For example, the negotiation of the use of packet data subconnections (step 404) and the negotiation of the at least one security parameter for the first packet data connection (step 403) may be interleaved. It is possible that the negotiation step 404 is repeated for each further packet data subconnection. Alternatively, the negotiation in step 404 may be carried out once and thereafter steps 405 and 406 may be performed for each packet data subconnection onward from the second packet data subconnection.

In the following, a specific embodiment relating to the Secure Shell and TCP is discussed in more detail. It is appreciated that any features discussed in connection with this specific embodiment are applicable also in connection with the more general discussion above.

The Secure Shell is a security protocol that can be used to securely transmit data. Some specific examples of the use of Secure Shell are secure file transfers and tunneling arbitrary TCP connections over a single encrypted Secure Shell session.

It is possible to transmit information relating to many data channels over one Secure Shell protocol session. For example, the data channels may relate to connections between various applications run in the endpoints of the Secure Shell protocol session. New data channels may be opened and existing data channels may be closed during the course of the Secure Shell protocol session. It is appreciated that the present invention is applicable to a Secure Shell session using a plurality of channels or using only one channel. The channels can be mapped on the TCP subconnections in a variety of ways. In principle, any number of TCP subconnections can be used to transmit data relating to a given channel and a given TCP subconnection may carry information relating to any number of channels.

When the Secure Shell protocol is used between two endpoints, a TCP connection is first set up between the endpoints for initial key exchange (compare step 401 in FIG. 4). The endpoints authenticate each other after the initial key exchange (step 402), and thereafter any data packet transfer between the endpoints may be encrypted using a session key. In accordance with the present invention, at least two TCP subconnections are established for transmitting data over the Secure Shell session. Each of these TCP subconnections has its security parameters, and security parameters (keys and/or algorithms) of the TCP subconnections may be changed by performing a key exchange relating to a specific TCP subconnection during the Secure Shell session. The key exchange messages need to be associated with the TCP subconnection to which they relate. In the Secure Shell protocol, the key exchange messages are typically sent using the TCP subconnection to which they relate. In general, the key exchange messages may explicitly indicate the relevant TCP subconnection, in which case they need not be sent using the TCP subconnection whose keying information they carry. The plurality of TCP subconnections relating to a Secure Shell session share authentication and server identification performed when the Secure Shell session is initially being set up.

In connection with the Secure Shell, the client typically initiates set up of the TCP subconnections (steps 401, 406). The client also typically initiates the negotiations in step 404. On a general level, however, the flowchart in FIG. 4 shows the steps carried out by the Secure Shell server or the Secure Shell client.

It is possible to route part of the TCP subconnections relating to one Secure Shell session via different routes between the nodes. For example, each node may have more than one IP address and the IP addresses may relate to different service providers. This way the effect of temporary overload situation in one of the service providers' networks is reduced. Also the load of the network interface may be shared.

Some examples of selecting a TCP subconnection for a Secure Shell protocol packet are the following. It is possible to use all set-up TCP subconnections in turns. As a more refined method, it is possible to jump over blocked TCP subconnections and this way to load evenly other TCP subconnection except the slowest TCP subconnections. Some channels within the Secure Shell session or some applications may be tagged so that data from these channels/applications is transmitted using a TCP subconnection having a specific security properties (for example, a specific encryption algorithm and a specific integrity check algorithm). This way data from different applications can transmitted using security parameters suitable for each application. For example, a video stream may be encrypted with a light encryption algorithm whereas data files maybe first compressed and then secured using strong encryption and data integrity check algorithms. This way no excessive delays are caused for the video stream and the file transfer is secured properly within a single Secure Shell session.

A further example is to monitor the data to be sent (for example, monitor channels within the Secure Shell session) and determine the TCP subconnection for the data based on properties of the data. If the data is compressible, it can be transmitted using a TCP subconnection where the compression is in use. It is possible, for example, to monitor data within channels and tag the channels accordingly. Then all data relating to a channel is transmitted using a TCP subconnection (or a group of TCP subconnections) having security parameters in accordance with the tag information of the channel.

In the following it is discussed how the Secure Shell protocol can be modified to support use of multiple TCP subconnections for one Secure Shell session. The Secure Shell protocol has no explicit mechanism for protocol extensions. In general, a protocol extension mechanism should be backward compatible. For example, if one of the nodes tries to use an extension mechanism, there should be no error situation if the other node does not support the protocol extension mechanism. Furthermore, if both nodes support the extension mechanism but not the same protocol extensions, the protocol connection should continue even if one node proposes a protocol extension the other node does not support. A protocol extension mechanism should provide a possibility to change basic functionalities of the protocol, for example, packet format. It should also be possible to request various protocol extensions one by one and then start using those protocol extensions supported by both nodes at a same time.

One solution for the protocol extension mechanism for the Secure Shell protocol is to use the key exchange mechanism, which can be initiated at any time during the Secure Shell session—except when there is already a key exchange going on. The protocol extension mechanism is implemented as a new key exchange algorithm. This new key exchange algorithm does not in fact generate new entropy for shared secrets, but transforms old secrets into new form. In other words, the new key exchange algorithm generates new session keys based on information exchanged earlier (for example, based on previous session keys), typically using part of the nonce information provided in the key exchange. After the new key exchange has been carried out, the new session keys will be taken into use together with those protocol extensions that were agreed upon.

In the following, the protocol extension mechanism for the Secure Shell protocol is discussed in more detail in connection with FIG. 5. The new key exchange algorithm (protocol extension mechanism) is indicated in the following by ext1 by way of an example.

In step 501, the client initiates the protocol extension mechanism by initiating a key exchange message sequence. The key exchange message sequence is initiated by sending a KEXINIT packet with ext1 as the first proposed key exchange method. In step 502, the server responds with a KEXINIT packet that has ext1 in its supported key exchange algorithms. As the client proposed ext1 and the server acknowledged support for ext1, ext1 is selected as the key exchange algorithm. The KEXINIT packets contain also information about supported encryption and/or integrity check algorithms. The nodes determine which encryption and/or integrity check algorithms will be used based on the KEXINIT packets.

If the client initiated the exchange, it typically has at least one command to send to the server in step 503. If the client has no commands to send, the method continues is step 507. In step 504, the client sends a COMMAND packet that performs some action in the server side. The specific structure of the command packet is defined, for example, in the IETF documentation relating to the Secure Shell protocol. The command actually does not take effect before entire key exchange is over and NEWKEYS packets are exchanged. In step 505, the server replies with a STATUS packet that contains information whether the command was successful or not. The STATUS packet contains also a possible reason for failure (for example, command not supported by the server) and can also include some command specific data. In step 506 it is checked whether the client still has one or more commands to send. If yes, the method returns to step 504. Otherwise, the client sends an END_OF_CMDS packet in step 507.

If the server has no commands to send, the client receives an END_OF_CMDS packet in step 508 and the method proceeds to step 511. The server may send a COMMAND packet that performs some action in the client side. In FIG. 5, the command is shown to be executed in step 509. It is, however appreciated that the command actually does not take effect before entire key exchange is over and NEWKEYS packets are exchanged. The client replies to a COMMAND packet with a STATUS packet in step 510. The STATUS packet contains information whether the command was successful or not. Furthermore, the STATUS packet contains a possible reason for failure and can also include some command specific data.

As the server may still have one or more commands to send, the method returns to step 508. When the server sends the END_OF_CMDS packet, the method continues in step 511. In steps 511 and 512, both the server and the client send NEWKEYS packets. Immediately after this packet, all changes made by (successful) commands during the key exchange take effect in step 513. New shared secret and key exchange hash is derived from the old secret and key exchange nonce (information contained in the key exchange initialization KEXINIT packets). New security algorithms and compression settings are taken into use according to algorithm lists in KEXINIT packets.

The key exchange negotiation is identical in the case where the server initiates the exchange. Roles are unchanged; the client always sends its commands first.

Since either side may choose not to send any commands during the ext1 session, the shortest possible ext1 exchange is as follows. Both sides send KEXINIT packets. The client sends END_OF_CMDS packet. The server sends END_OF_CMDS packet. Both sides send NEWKEYS packet. This simple key exchange can be used in renegotiation of security parameters, such as encryption and integrity check algorithms and compression method.

There is a slight difficulty that arises from the algorithm selection logic of the Security Shell protocol when the server side is the initiator of the ext1 key exchange mechanism (protocol extension mechanism). The first algorithm in the list of the supported algorithms of the client is always selected. The client cannot always put ext1 first to its list, as this would make generation of a new key for an already selected algorithm (in other words, rekey) impossible because ext1 would always get selected.

Therefore clients and servers supporting ext1 may implement the following logic. If the client is initiating a normal key exchange (initial or rekey), it adds ext1 as the last of its supported key exchange mechanisms. On the other hand, if the client is initiating an ext1 key exchange, it adds ext1 as the first of its supported key exchange mechanisms. Similarly, if the server is initiating a normal key exchange (initial or rekey), it adds ext1 as the last of its supported key exchange mechanisms. If the server is initiating an ext1 key exchange, it adds ext1 as the first of its supported key exchange mechanisms.

If the client receives a KEXINIT message with ext1 as the first supported key exchange message it should reply with a KEXINIT message with ext1 as the first supported key exchange mechanism. If the client receives a KEXINIT message with ext1 as the first supported key exchange mechanism but has already sent its own KEXINIT where ext1 is not the first on the supported algorithms list, the key exchange is selected according to the normal algorithm selection logic and when the selected key exchange algorithm is completed, the server can try to initiate ext1 exchange again.

It is appreciated that no special attention needs to be directed to the case where both sides are initiating ext1 exchange simultaneously. This simply leads to the situation where both sides have commands to send during the ext1 exchange and this is acceptable.

The Secure Shell protocol extension mechanism discussed above is backward compatible. Should the other endpoint of the Secure Shell session not support the protocol extension mechanism, the client and server simply perform a key exchange. In a case where both the client and server support the protocol extension mechanism but one of them fails to support the transport distribution (or any other command sent during the protocol extension mechanism), the response to the unsupported command is an error message indicating that command is unsupported. The protocol extension mechanism terminates properly after the error message, as such error messages can occur during the key exchange. It is appreciated that in general a failure in the key exchange causes the Secure Shell session to be disconnected.

Figure 5:
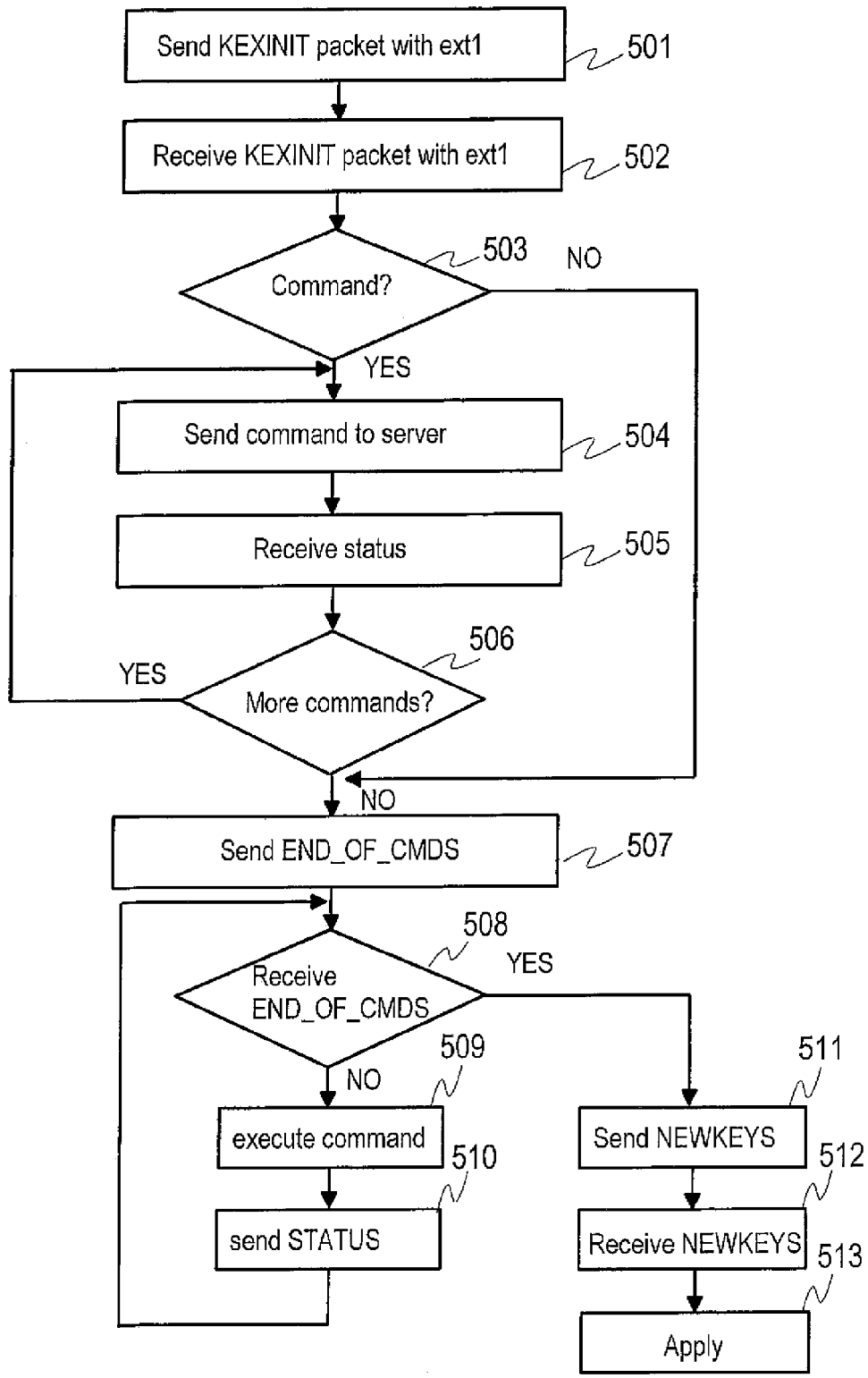
FIG. 5 shows, as an example, a flowchart relating to a protocol extension mechanism for the Secure Shell protocol.
Figure 6:
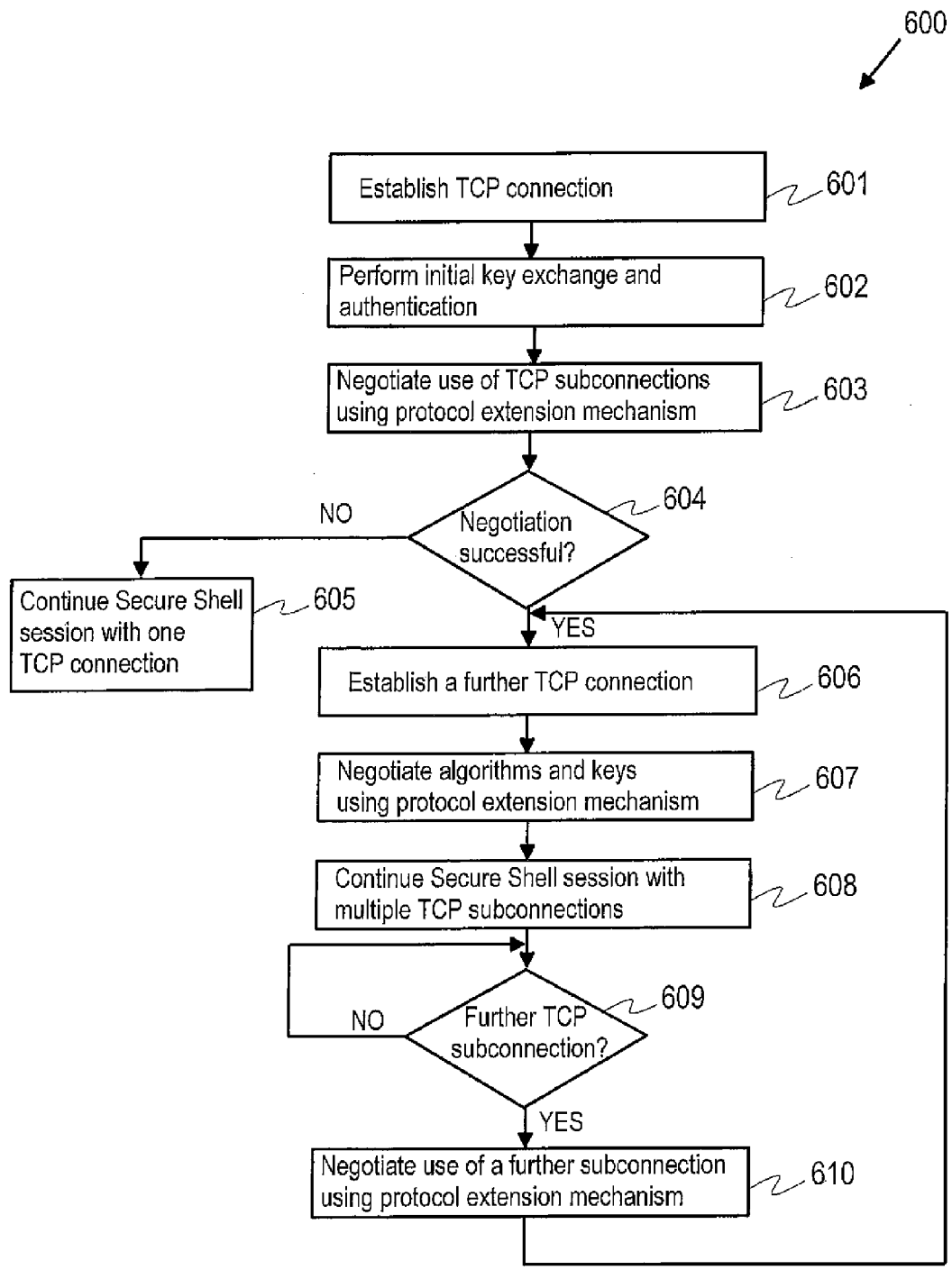
FIG. 6 shows, as an example, a flowchart of a method for providing distributed transport for the Secure Shell protocol in accordance with an embodiment of the invention.

FIG. 6 shows, as an example, a flowchart of a method 600 for providing distributed transport for the Secure Shell protocol in accordance with an embodiment of the invention. Negotiations relating to the use of TCP subconnections for a Secure Shell session are performed using the protocol extension mechanism shown in FIG. 5. In step 601, a first TCP connection is established between the client and the server for the Secure Shell protocol. In step 602, the client and server nodes perform mutual authentication and initial key exchange in accordance with the known Secure Shell procedure. After step 602, the security algorithms and key agreed in step 602 are used for the first TCP connection. When a Secure Shell session using one TCP connection has been established in step 601 and 602, it is possible to open TCP subconnections for the Secure Shell session in the following way at any time during the Secure Shell session.

Negotiation about transport distribution for the Secure Shell session or—in other words—negotiation about the use of multiple TOP subconnections for the Secure Shell session is carried out in step 603 using the protocol extension mechanism shown in FIG. 5. The client initiates the protocol extension mechanism by placing ext1 as the first key exchange algorithm in the KEXINIT packet (see step 501). Alternatively, the server may initiate the protocol extension mechanism. In the following example, it is assumed that the client is the initiator, as the client typically can better decide whether to try to use TCP subconnections and how many TCP subconnections to use. The client then sends a command to add sequence numbers or other order information to the Secure Shell protocol packets (step 504), if the Secure Shell protocol packets do not already contain order information. The server responds with an OK status message (step 505). Thereafter the client sends a command indicating use of TCP subconnections is in connection with this Secure Shell connection (step 504). As a particular example, the command may be called a transport-distribution-init command. The server responds with a status message, which may contain some information. Thereafter the client and the server calculate shared secret data for use in securing the data to be transmitted using the already established first TCP connection. The protocol extension mechanism of step 603 is finished with the NEWKEYS messages (steps 511, 512). After the protocol extension mechanism, data transfer over the first TCP connection continues using the security algorithms and keys negotiated in connection with the protocol extension mechanism.

It is appreciated that the protocol extension mechanism for the Secure Shell protocol in step 603 provides one specific example of step 404. In step 603, security algorithms and security keys for the already established first TCP connection are additionally negotiated, as explained above. The security algorithms negotiated in step 603 may be the same as used before step 603, but keys typically change as a result of step 603. It is possible that a security protocol supports a protocol extension mechanism, where new security algorithms and/or keys are not generated for the existing packet data connection.

If it turns out during step 603 that the other node does not support transport distribution, the Secure Shell session typically continues with the already established TCP connection. Steps 604 and 605 in FIG. 6 show this option. In step 605, the security algorithms and key negotiated in step 603 are used for the single TCP connection.

When the negotiation about the use of the distributed transport mechanisms has been successful, a further TCP connection is established in step 606. Typically the client initiates the TCP connections for the Secure Shell protocol. Once the TCP connection has been established, the client and server use the protocol extension mechanism discussed in connection with FIG. 5 for negotiating security algorithms and keys for the new TCP connection in step 607. In general, this is the only case where the ext1 type key exchange can be performed as the first key exchange for a TCP connection. Step 607 is carried out using the TCP connection established in step 606, and thus the client and server and associate the TCP connection and the Secure Shell protocol packets relating to the key exchange. During the protocol extension mechanism in step 607 typically the client requests explicit ordering information to the Secure Shell packets (step 504) and sends a command that this new TCP connection is to be used together with at least one already existing TCP connection as TCP subconnections for the Secure Shell session between the nodes (step

504). This command may be called, for example, a transport-distribution-execute command.

When the protocol extension mechanism in step 607 terminates, the new TCP connection does not any more serve a new Secure Protocol session between the nodes. The new TCP connection is one of multiple TCP subconnections serving a single Secure Shell Session between the nodes. Security algorithms and keys negotiated in step 607 are used for the new TCP connection in step 608, where the Security Shell session continues using multiple TCP subconnections. It is appreciated that when using the Secure Shell protocol extension mechanism, the keys for the new TCP connection depend also on information relating to the previous key exchange in the Secure Shell session (that is, on either a normal key exchange or on a protocol extension mechanism).

If more than one further TCP subconnection is to be established either in the beginning of the Secure Shell session or later on during the session (step 609), the protocol extension mechanism is used in step 610 to initiate the establishment of a further TCP subconnection for the distributed transport. Step 609 may be carried out using any of the already existing TCP subconnection relating to this Secure Shell session. This is because each of the multiple TCP subconnections has a similar role in the Secure Shell distributed transport mechanism. Thereafter steps 606 to 608 are performed, as shown in FIG. 6.

Alternatively, it is possible that more than one transport-distribution-init command is sent in step 603. One transport-distribution-init command is sent for each new TCP subconnection. In this case, steps 606 to 608 are repeated once for each new TCP subconnection.

As a further alternative, it may be possible that in the negotiation in step 603, the number of new TCP connections is indicated as a parameter in a command, for example, in the transport-distribution-init command.

It is appreciated that if, for some reason, a new TCP connection would not be established after step 603 or 610, the Secure Shell session typically continues using the existing single TCP connection or the existing at least two TCP subconnections for the distributed transport.

Referring to FIGS. 4 and 6, it is appreciated that step 603 alone or steps 603 and 610 in combination can be considered as a specific example of step 404. Step 607 provides an example of step 405. As mentioned above, the order of steps may vary. As an example, consider the following. In FIG. 4, it is explained by way of example that security parameters for a new packet data connection are negotiated in step 405 before the second packet data connection is initiated in step 406. In FIG. 6, the second packet data connection is established in step 606 and security algorithms and keys are negotiated in step 607 using the already established packet data connection.

If a given TCP subconnection of a Secure Shell session needs to be terminated, this can be done in the following way during the Secure Shell session. The following information is sent over the TCP subconnection to be terminated. The client initiates the protocol extension mechanism with a KEXINIT message (step 501). Later on during the protocol extension mechanism, the client sends a command to terminate the TCP subconnection (step 504), and the server responds with an OK status message (step 505). The protocol extension mechanism is ended (steps 511, 512) and the TCP subconnection is terminated. The last Secure Shell protocol packets for each direction are typically the NEWKEYS packets. The Secure Shell protocol session continues using the remaining TCP subconnections or a single TCP connection.

It is appreciated that in this description the term "node" refers to any device capable of setting up packet data connections and transmitting data using the packet data connection and a security protocol. The terms "client" and "server" refer to the client/server roles of nodes. Embodiments of the present invention are typically implemented as computer programs.

Some specific examples of nodes where the present invention is applicable are the following. Firstly, a node may be an edge network node handling securing of virtual private network connections over a public data network. Secondly, a node may be any network node that needs to secure data to be transmitted or received. Thirdly, a node may be a portable communications device.

A system in accordance with an embodiment of the invention is typically a data processing system, which may include a number of computing devices. The system may be, for example, a server cluster supporting communications using a security protocol. A device in accordance with an embodiment of the invention is typically a computer or other computing device, for example, a server supporting communications using a security protocol.

It is appreciated that embodiments of the invention may be implemented using software running on a general purpose computing device, using dedicated hardware, or using a suitable combination of software and dedicated hardware. It is appreciated that a computer program in accordance with an embodiment of the invention may be embodied on a record medium, stored in a computer memory or carried on an electrical carrier signal. A computer program product in accordance with an embodiment of the invention may be embodied on a computer readable record medium.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A method for communicating packet data between two endpoints over a Secure Shell session, the method comprising:
    using the Secure Shell protocol to authenticate the two end points to each other after an initial key exchange; and
    establishing at least two Transfer Control Protocol (TCP) subconnections for communication of data over the authenticated Secure Shell session, wherein at least one of the TCP subconnections is maintained for the duration of the Secure Shell session;
    controlling throughput via the Secure Shell session by selectively distributing said data over the at least two TCP subconnections;
    transporting said data in the Secure Shell session distributed on the at least two TCP subconnections; and
    changing security parameters relating to a specific TCP subconnection during the Secure Shell session using at least one key exchange message.

2. The method of claim 1, comprising sharing authentication performed when the Secure Shell session was initially being set up for a plurality of TCP subconnections.

3. The method of claim 1, comprising routing TCP subconnections associated with the Secure Shell session via different routes between the end points.

4. The method of claim 1, comprising using more than one Internet Protocol (IP) address for the TCP subconnections associated with the Secure Shell session.

5. The method of claim 1, comprising selecting a subconnection to use for communication of data at least partly based on compressibility of said data.

6. The method of claim 1, comprising:
sending a command during a key exchange requesting termination of a TCP subconnection;
receiving a status message from a server; and
terminating the TCP subconnection after receiving said status message.

7. An apparatus for an endpoint of a data communication session, the apparatus including at least one processor and at least one memory having processor-executable code in which the processor-executable code is configured to cause the endpoint at least to communicate packet data with another endpoint over a Secure Shell session, the apparatus comprising:
a security protocol entity configured to use the Secure Shell protocol to authenticate the two end points of the Secure Shell session to each other after an initial key exchange; and
a transport protocol entity configured to:
establish at least two Transfer Control Protocol (TCP) subconnections for communication of data over the authenticated Secure Shell session,
maintain at least one of the TCP subconnections for the duration of the Secure Shell session,
control throughput via the Secure Shell session by selectively distributing said data over the at least two TCP subconnections, and
transport said data in the Secure Shell session distributed on the at least two TCP subconnections,
wherein the security protocol entity is further configured to change security parameters relating to a specific TCP subconnection during the Secure Shell session based on at least one key exchange message.

8. The apparatus of claim 7, wherein the apparatus is configured to share the authentication performed when the Secure Shell session was initially set up for a plurality of TCP subconnections.

9. The apparatus of claim 7, wherein the transport protocol entity is configured to route TCP subconnections associated with the Secure Shell session via different routes.

10. The apparatus of claim 7, wherein the transport protocol entity is configured to use more than one Internet Protocol (IP) address for the TCP subconnections associated with the Secure Shell session.

11. The apparatus of claim 7, wherein the apparatus is configured to select a subconnection to use for communication of data at least partly based on compressibility of said data.

12. The apparatus of claim 7, wherein the apparatus is configured to send a command during a key exchange requesting termination of a TCP subconnection, to receive a status message from a server, and to terminate the TCP subconnection after receiving said status message.

13. A system in a data network, the system comprising:
a first node and a second node for communicating packet data over a Secure Shell session,
the first node comprising:
at least one processor,
a security protocol entity containing instructions executable by the at least one processor, the security protocol entity configured to use the Secure Shell protocol to perform authentication with the second node after an initial key exchange, and
a transport protocol entity configured to establish at least two Transfer Control Protocol (TCP) subconnections with the second node for communicating data over the authenticated Secure Shell session, maintain at least one of the TCP subconnections for the duration of the Secure Shell session, control throughput via the Secure Shell session by selectively distributing said data over the at least two TCP subconnections, and transport said data in the Secure Shell session distributed on the at least two TCP subconnections; and
the second node comprising: at least one processor,
a security protocol entity containing instructions executable by the at least one processor, the security protocol entity configured to use the Secure Shell protocol to perform authentication with the first node after an initial key exchange, and
a transport protocol entity configured to establish at least two Transfer Control Protocol (TCP) subconnections with the first node for communicating data over the authenticated Secure Shell session, maintain at least one of the TCP subconnections for the duration of the Secure Shell session, control throughput via the Secure Shell session by selectively distributing said data over the at least two TCP subconnections, and transport said data in the Secure Shell session distributed on the at least two TCP subconnections,
wherein the security protocol entity is further configured to change security parameters relating to a specific TCP subconnection during the Secure Shell session based on at least one key exchange message.

14. The system of claim 13, wherein at least one of the nodes comprises a server.

15. The system of claim 14, wherein one of the nodes comprises a client.

16. A computer program product embedded on a non-transitory computer-readable medium comprising:
program code for controlling communication of packet data between two endpoints over a Secure Shell session, the program. code being configured to cause:
authentication of the two end points to each other after an initial key exchange based on the Secure Shell protocol,
establishment, for the authenticated endpoints, of at least two Transfer Control Protocol (TCP) subconnections for communication of data over the authenticated Secure Shell session,
maintenance of at least one of the TCP subconnections for the duration of the Secure Shell session,
control of throughput via the Secure Shell session by selectively distributing said data over the at least two TCP subconnections,
transportation of said data in the Secure Shell session distributed on the at least two TCP subconnections, and
change of security parameters relating to a specific TCP subconnection during the Secure Shell session using at least one key exchange message.

* * * * *